United States Patent
Armstrong

(10) Patent No.: US 8,096,360 B2
(45) Date of Patent: Jan. 17, 2012

(54) ALKALINE β-MANNANASE CONTAINING COMPOSITIONS USEFUL FOR THE HYDROLYSIS OF GUAR IN HIGH PH ENVIRONMENTS AND METHODS RELATED THERETO

(75) Inventor: Charles David Armstrong, Tomball, TX (US)

(73) Assignee: Baker Hughes Incorporated, Houston, TX (US)

(*) Notice: Subject to any disclaimer, the term of this patent is extended or adjusted under 35 U.S.C. 154(b) by 395 days.

(21) Appl. No.: 12/275,951

(22) Filed: Nov. 21, 2008

(65) Prior Publication Data

US 2010/0126726 A1    May 27, 2010

(51) Int. Cl.
*E21B 43/26* (2006.01)
*C09K 8/68* (2006.01)

(52) U.S. Cl. ............ 166/300; 166/308.5; 507/201; 507/211; 507/214; 507/903; 507/921; 507/922

(58) Field of Classification Search ............ None
See application file for complete search history.

(56) References Cited

U.S. PATENT DOCUMENTS

| 5,201,370 A | 4/1993 | Tjon-Joe-Pin |
| 5,421,412 A * | 6/1995 | Kelly et al. .................. 166/300 |
| 5,562,160 A * | 10/1996 | Brannon et al. ............ 166/250.1 |
| 5,566,759 A * | 10/1996 | Tjon-Joe-Pin et al. ....... 166/300 |
| 5,806,597 A * | 9/1998 | Tjon-Joe-Pin et al. ....... 166/300 |
| 6,197,730 B1 * | 3/2001 | Kelly et al. .................. 507/211 |
| 6,566,114 B1 * | 5/2003 | Kauppinen et al. .......... 435/211 |
| 2003/0203466 A1 * | 10/2003 | Kauppinen et al. .......... 435/200 |

OTHER PUBLICATIONS

Yanhe Ma, Yanfen Xue, Yuetan Dou, Zhenghong Xu, Wenyi Tao and Peijin Zhou, Characterization and gene cloning of a novel B-mannanase from alkaliphilic *Bacillus* sp. N16-5, Extremophiles, Aug. 14, 2004, pp. 447-454, vol. 8, Springer-Verlag 2004.

BJ Services Company, EnZyme G Breakers, Product Information, Dated Jul. 28, 2000.

* cited by examiner

*Primary Examiner* — George Suchfield
(74) *Attorney, Agent, or Firm* — John Wilson Jones; Jones & Smith, LLP

(57) ABSTRACT

Methods and compositions of fracturing formations are provided. The fracturing fluid includes an enzyme breaker that decreases the viscosity of the fracturing fluid over time. The enzyme breaker can be used in environments having a pH value ranging from about 7 to about 12.

22 Claims, 10 Drawing Sheets

GENE SEQUENCING
```
CTCGAGATGAGCAGCGGTTTTTATGTGGATGGTAACACCCTGTATGATGCCAATGGTCAG  60
CCGTTTGTGATGAAAGGCATTAACCATGGCCATGCCTGGTATAAAGATACCGCGAGCACC  120
GCGATTCCGGCGATTGCCGAACAGGGTGCGAATACCATCCGCATTGTGCTGAGCGATGGT  180
GGCCAGTGGGAAAAAGATGATATTGATACCGTGCGTGAAGTGATCGAACTGGCGGAACAG  240
AATAAAATGGTGGCGGTGGTGGAAGTTCATGATGCGACCGGTCGCGATAGCCGTAGCGAT  300
CTGGATCGCGCGGTGGATTATTGGATCGAAATGAAAGATGCGCTGATCGGCAAAGAAGAT  360
ACCGTGATTATTAATATTGCGAACGAATGGTATGGTAGCTGGGATGGCGCGGCGTGGGCC  420
GATGGCTATATCGATGTGATTCCGAAACTGCGCGATGCGGGTCTGACCCATACCCTGATG  480
GTGGATGCGGCGGGTTGGGGCCAGTATCCGCAGAGCATTCATGATTATGGTCAGGATGTG  540
TTCAATGCCGATCCGCTGAAAAACACCATCTTTAGCATTCATATGTATGAATATGCGGGC  600
GGTGATGCGAATACCGTTCGCAGCAATATCGATCGTGTGATCGATCAGGATCTGGCCCTG  660
GTTATTGGCGAATTCGGCCATCGTCATACCGATGGCGATGTGGATGAAGATACCATTCTG  720
AGCTATAGCGAAGAAACCGGTACCGGCTGGCTGGCGTGGAGCTGGAAAGGTAATAGCGCG  780
GAATGGGATTATCTGGATCTGAGCGAAGATTGGGCCGGCAATCACCTGACCGATTGGGGC  840
AACCGTATTGTGCATGGCGCGAACGGCCTGCAGGAAACCAGCAAACCGAGCACCGTTTTC  900
ACCGATGATAACGGTGGCGCGCCGGAACCGCCGACCACCACCACCCTGTATGATTTTGAA  960
GGCAGCACCCAGGGCTGGCACGGCAGCAACGTGATGGGCGGCCCGTGGAGCGTGACCGAA  1020
TGGGGTGCGAGCGGCAATTATAGCCTGAAAGGCGATGTGAACCTGAGCAGCAACAGCAGC  1080
CACGAACTGTATAGCGAACAGAGCCGTAACCTGCATGGCTATAGCCAGCTGAACGCGACC  1140
GTGCGTCATGCGAACTGGGGCAACCCGGGCAATGGCATGAATGCCCGTCTGTATGTGAAA  1200
ACCGGCAGCGATTATACCTGGTATAGCGGCCCGTTTACCCGCATCAATAGCAGCAATAGC  1260
GGTACCACCCTGAGCTTTGATCTGAACAACATCGAAAATAGCCATCACGTGCGCGAAATT  1320
GGCGTTCAGTTTAGCGCCGCGGATAACAGCAGCGGCCAGACCGCGCTGTATGTGGATAAT  1380
GTGACCCTGCGTTAATGATCA                                          1401
```
FIGURE 1A

```
                                                         Original_Gene
                                                         Optimized_Gene ------ATGAGTTCAGGCTTTTATGTTGATGGCAATACGTTATATGACGCAAACGGGCAA    54
CTCGAGATGAGCAGCGGTTTTTATGTGGATGGTAACACCCTGTATGATGCCAATGGTCAG   60
     * **  * ** ******** ***** ** **  * ***** ** ** ** **

CCATTTGTCATGAAAGGCATTAACCATGGACATGCTTGGTATAAAGACACCGCTTCAACA   114
CCGTTTGTGATGAAAGGCATTAACCATGGCCATGCCTGGTATAAAGATACCGCGAGCACC   120
** ***** ******************** ***** ***********.*****   **

GCTATTCCTGCCATTGCAGAGCAAGGCGCGAACACGATACGTATTGTTTTATCAGATGGC   174
GCGATTCCGGCGATTGCCGAACAGGGTGCGAATACCATCCGCATTGTGCTGAGCGATGGT   180
** ***** ** ***** ** **  ** ***** ** ** ** *****  *    *****

GGTCAATGGGAAAAAGACGACATTGACACCGTTCGTGAAGTTATTGAGCTTGCGGAGCAA   234
GGCCAGTGGGAAAAAGATGATATTGATACCGTGCGTGAAGTGATCGAACTGGCGGAACAG   240
** ** *********** ** ***** ***** ******** ** ** ** ***** **

AATAAAATGGTGGCTGTCGTTGAAGTTCATGATGCCACGGGCCGTGATTCACGCAGTGAT   294
AATAAAATGGTGGCGGTGGTGGAAGTTCATGATGCGACCGGTCGCGATAGCCGTAGCGAT   300
**************  ** ** ************* **  ** ** *** ** ** ***

TTAGATCGGGCAGTCGATTATTGGATAGAGATGAAAGATGCACTTATCGGCAAAGAGGAT   354
CTGGATCGCGCGGTGGATTATTGGATCGAAATGAAAGATGCGCTGATCGGCAAAGAAGAT   360
 * ***** ** ** *********** ** ********** ** ********** ***

ACTGTCATTATTAACATTGCAAACGAATGGTATGGCAGTTGGGATGGCGCCGCTTGGGCT   414
ACCGTGATTATTAATATTGCGAACGAATGGTATGGTAGCTGGGATGGCGCGGCGTGGGCC   420
** ** ******** ***** ************** ** *********** ** *****

GATGGCTACATTGATGTCATTCCGAAGCTTCGCGATGCCGGCTTAACACACACCTTAATG   474
GATGGCTATATCGATGTGATTCCGAAACTGCGCGATGCGGGTCTGACCCATACCCTGATG   480
******** ** ***** ******** ** ******** **  * ** ** *** * ***

GTTGATGCAGCAGGATGGGGGCAATATCCGCAATCTATTCATGATTACGGACAAGATGTG   534
GTGGATGCGGCGGGTTGGGGCCAGTATCCGCAGAGCATTCATGATTATGGTCAGGATGTG   540
** ***** ** **  ** ***** ********   ********** ** ** ******

TTTAATGCAGATCCGTTAAAAAATACGATATTCTCCATCCATATGTATGAGTATGCTGGT   594
TTCAATGCCGATCCGCTGAAAAACACCATCTTTAGCATTCATATGTATGAATATGCGGGC   600
** ***** ****** * ***** ** ** **    *** ********** ***** **

GGTGATGCTAACACTGTTAGATCAAATATTGATAGAGTCATAGATCAAGACCTTGCTCTC   654
GGTGATGCGAATACCGTTCGCAGCAATATCGATCGTGTGATCGATCAGGATCTGGCCCTG   660
******** ** ** ***  *   ***** ***  * ** *  ***** ** ** ** **

GTAATAGGTGAGTTCGGTCATAGACACACTGATGGCGATGTTGATGAAGATACAATCCTT   714
GTTATTGGCGAATTCGGCCATCGTCATACCGATGGCGATGTGGATGAAGATACCATTCTG   720
** ** ** ** ***** *** * ** ** **********  *********** ** **

AGTTATTCTGAAGAAACTGGCACAGGATGGCTCGCTTGGTCTTGGAAAGGCAACAGTGCC   774
AGCTATAGCGAAGAAACCGGTACCGGCTGGCTGGCGTGGAGCTGGAAAGGTAATAGCGCG   780
** ***  ******** ** ** ** ***** ** ***  ********* ** ** **

GAATGGGATTATTTAGACCTTTCAGAAGATTGGGCTGGTAACCATTTAACTGATTGGGGA   834
GAATGGGATTATCTGGATCTGAGCGAAGATTGGGCCGGCAATCACCTGACCGATTGGGGC   840
************ *  **  * ** ********** ** ** **  * *  ********

AATAGGATTGTCCACGGGGCAAATGGCTTGCAGGAAACCTCCAAACCATCCACCGTATTT   894
AACCGTATTGTGCATGGCGCGAACGGCCTGCAGGAAACCAGCAAACCGAGCACCGTTTTC   900
**  * ***** ** ** ** ** *** ***********  ******  * ***** **
```

FIGURE 1B

```
ACAGATGATAACGGTGGTGCCCCTGAACCGCCAACTACTACTACCTTGTATGACTTTGAA 954
ACCGATGATAACGGTGGCGCGCCGGAACCGCCGACCACCACCACCCTGTATGATTTTGAA 960
** ************* ** ** ******** ** ** ** *** ****** ******

GGAAGCACACAAGGGTGGCATGGAAGCAACGTGATGGGTGGCCCTTGGTCCGTAACAGAA 1014
GGCAGCACCCAGGGCTGGCACGGCAGCAACGTGATGGGCGGCCCGTGGAGCGTGACCGAA 1020
** ***** ** ** ***** ** ************** ***** *** *** ** ***

TGGGGTGCGTCAGGCAACTACTCTTTAAAGGGCGATGTCAATTTAAGCTCAAATTCTTCA 1074
TGGGGTGCGAGCGGCAATTATAGCCTGAAAGGCGATGTGAACCTGAGCAGCAACAGCAGC 1080
*********    ***** **     *  ** ******** **  * ***      **

CATGAACTGTATAGTGAACAAAGTCGTAATCTACACGGATACTCTCAGCTAAATGCAACC 1134
CACGAACTGTATAGCGAACAGAGCCGTAACCTGCATGGCTATAGCCAGCTGAACGCGACC 1140
** ************ ***** ** ***** **  ** ** ** ** ***** ** ***

GTTCGCCATGCCAATTGGGGAAATCCCGGTAATGGCATGAATGCAAGACTTTACGTGAAA 1194
GTGCGTCATGCGAACTGGGGCAACCCGGGCAATGGCATGAATGCCCGTCTGTATGTGAAA 1200
** ** ***** **  ***** **  ****  ************    **  ** *****

ACGGGCTCTGATTATACATGGTATAGCGGTCCTTTTACACGTATCAATAGCTCCAACTCA 1254
ACCGGCAGCGATTATACCTGGTATAGCGGCCCGTTTACCCGCATCAATAGCAGCAATAGC 1260
** ***   ******** *********** ** ***** ** *********   *** ***

GGTACAACGTTATCTTTTGATTTAAACAACATCGAAAATAGTCATCATGTTAGGGAAATA 1314
GGTACCACCCTGAGCTTTGATCTGAACAACATCGAAAATAGCCATCACGTGCGCGAAATT 1320
***** **  *    ****** * ***************** ***** **  * *****

GGTGTGCAATTTTCAGCTGCAGATAATAGCAGCGGTCAAACTGCTCTATACGTTGATAAT 1374
GGCGTTCAGTTTAGCGCCGCGGATAACAGCAGCGGCCAGACCGCGCTGTATGTGGATAAT 1380
** ** ** *** ** ** ** ***** ******* ** ** ** *** ** ********

GTTACTTTAAGATAG------ 1389
GTGACCCTGCGTTAATGATCA 1401
** **  *   *  **
```

FIGURE 1B (CONTINUED)

under pH ranges ≧10.5. A need also exists for a gel system for a well fracturing operation that can

SEQUENCE LISTING

```
<160> NUMBER OF SEQ ID NOS: 2

<210> SEQ ID NO 1
<211> LENGTH: 1389
<212> TYPE: DNA
<213> ORGANISM: Artificial sequence
<220> FEATURE:
<223> OTHER INFORMATION: Synthetic

<400> SEQUENCE: 1
atgagttcag gcttttatgt tgatggcaat acgttatatg acgcaaacgg gcaaccattt      60
gtcatgaaag gcattaacca tggacatgct tggtataaag acaccgcttc aacagctatt     120
cctgccattg cagagcaagg cgcgaacacg atacgtattg ttttatcaga tggcggtcaa     180
tgggaaaaag acgacattga caccgttcgt gaagttattg agcttgcgga gcaaaataaa     240
atggtggctg tcgttgaagt tcatgatgcc acgggccgtg attcacgcag tgatttagat     300
cgggcagtcg attattggat agagatgaaa gatgcactta tcggcaaaga ggatactgtc     360
attattaaca ttgcaaacga atggtatggc agttgggatg gcgccgcttg ggctgatggc     420
tacattgatg tcattccgaa gcttcgcgat gccggcttaa cacacacctt aatggttgat     480
gcagcaggat gggggcaata tccgcaatct attcatgatt acggacaaga tgtgtttaat     540
gcagatccgt taaaaaatac gatattctcc atccatatgt atgagtatgc tggtggtgat     600
gctaacactg ttagatcaaa tattgataga gtcatagatc aagaccttgc tctcgtaata     660
ggtgagttcg gtcatagaca cactgatggc gatgttgatg aagatacaat ccttagttat     720
tctgaagaaa ctggcacagg atggctcgct tggtcttgga aaggcaacag tgccgaatgg     780
gattatttag accttcaga agattgggct ggtaaccatt taactgattg gggaaatagg     840
attgtccacg gggcaaatgg cttgcaggaa acctccaaac catccaccgt atttacagat     900
gataacggtg gtgcccctga accgccaact actactacct tgtatgactt tgaaggaagc     960
acacaagggt ggcatggaag caacgtgatg ggtggccctt ggtccgtaac agaatggggt    1020
gcgtcaggca actactcttt aaagggcgat gtcaatttaa gctcaaattc ttcacatgaa    1080
ctgtatagtg aacaaagtcg taatctacac ggatactctc agctaaatgc aaccgttcgc    1140
catgccaatt ggggaaatcc cggtaatggc atgaatgcaa gactttacgt gaaaacgggc    1200
```

-continued

```
tctgattata catggtatag cggtcctttt acacgtatca atagctccaa ctcaggtaca      1260
acgttatctt ttgatttaaa caacatcgaa aatagtcatc atgttaggga aataggtgtg      1320
caattttcag ctgcagataa tagcagcggt caaactgctc tatacgttga taatgttact      1380
ttaagatag                                                              1389

<210> SEQ ID NO 2
<211> LENGTH: 1401
<212> TYPE: DNA
<213> ORGANISM: Artificial sequence
<220> FEATURE:
<223> OTHER INFORMATION: Synthetic

<400> SEQUENCE: 2
ctcgagatga gcagcggttt ttatgtggat ggtaacaccc tgtatgatgc caatggtcag        60
ccgtttgtga tgaaaggcat taaccatggc catgcctggt ataaagatac cgcgagcacc       120
gcgattccgg cgattgccga acagggtgcg aataccatcc gcattgtgct gagcgatggt       180
ggccagtggg aaaaagatga tattgatacc gtgcgtgaag tgatcgaact ggcggaacag       240
aataaaatgg tggcggtggt ggaagttcat gatgcgaccg tcgcgatag ccgtagcgat        300 ctggatcgcg cggtggatta ttggatcgaa atgaaagatg cgctgatcgg caaagaagat       360
accgtgatta ttaatattgc gaacgaatgg tatggtagct gggatggcgc ggcgtgggcc       420
gatggctata tcgatgtgat tccgaaactg cgcgatgcgg gtctgaccca tacctgatg      480 gtggatgcgg cgggttgggg ccagtatccg cagagcattc atgattatgg tcaggatgtg       540
ttcaatgccg atccgctgaa aaacaccatc tttagcattc atatgtatga atatgcgggc       600
ggtgatgcga ataccgttcg cagcaatatc gatcgtgtga tcgatcagga tctggccctg       660
gttattggcg aattcggcca tcgtcatacc gatggcgatg tggatgaaga taccattctg       720
agctatagcg aagaaaccgg taccggctgg ctggcgtgga gctggaaagg taatagcgcg       780
gaatgggatt atctggatct gagcgaagat tgggccggca atcacctgac cgattggggc       840
aaccgtattg tgcatggcgc gaacggcctg caggaaacca gcaaaccgag caccgttttc       900
accgatgata acggtggcgc gccggaaccg ccgaccacca ccaccctgta tgattttgaa       960
ggcagcaccc agggctggca cggcagcaac gtgatgggcg gcccgtggag cgtgaccgaa      1020
tggggtgcga gcggcaatta tagcctgaaa ggcgatgtga acctgagcag caacagcagc      1080
cacgaactgt atagcgaaca gagccgtaac ctgcatggct atagccagct gaacgcgacc      1140
gtgcgtcatg cgaactgggg caacccgggc aatggcatga atgcccgtct gtatgtgaaa      1200
accggcagcg attatacctg gtatagcggc ccgtttaccc gcatcaatag cagcaatagc      1260
ggtaccaccc tgagctttga tctgaacaac atcgaaaata gccatcacgt gcgcgaaatt      1320
ggcgttcagt ttagcgccgc ggataacagc agcggccaga ccgcgctgta tgtggataat      1380
gtgaccctgc gttaatgatc a                                                1401
```

ALKALINE β-MANNANASE CONTAINING COMPOSITIONS USEFUL FOR THE HYDROLYSIS OF GUAR IN HIGH PH ENVIRONMENTS AND METHODS RELATED THERETO

BACKGROUND OF THE INVENTION

1. Field of the Invention

The invention relates to gelled fracturing fluids used in well bore operations. More specifically, the present invention relates to methods of hydrolyzing gelled fracturing fluids using enzymes incorporated in the gelled fracturing fluids, particularly in environments having elevated pH values.

2. Description of the Related Art

Hydraulic fracturing is used to create subterranean fractures that extend from the borehole into rock formation in order to increase the rate at which fluids can be produced by the formation. Generally, a high viscosity fracturing fluid is pumped into the well at sufficient pressure to fracture the subterranean formation. In order to maintain the increased exposure to the formation, a solid proppant is added to the fracturing fluid which is carried into the fracture by the high pressure applied to the fluid.

Some conventional fracturing fluids include guar gum (galactomannans) or guar gum derivatives, such as hydroxypropyl guar (HPG), carboxymethyl guar (CMG), or carboxymethylhydroxypropyl guar (CMHPG). These polymers can be crosslinked together in order to increase their viscosities and increase their capabilities of proppant transport.

Once the formation is adequately fractured and the proppant is in place, the fracturing fluid is recovered typically through the use of breakers. Breakers generally reduce the fluid's viscosity to a low enough value that allows the proppant to settle into the fracture and thereby increase the exposure of the formation to the well. Breakers work by reducing the molecular weight of the polymers, which "breaks" the polymer. The fracture then becomes a high permeability conduit for fluids and gas to be produced back to the well.

Besides providing a breaking mechanism for the gelled fluid to facilitate recovery of the fluid, breakers can also be used to control the timing of the breaking of the fracturing fluids, which is important. Gels that break prematurely can cause suspended proppant material to settle out of the gel before being introduced a sufficient distance into the produced fracture. Premature breaking can also result in a premature reduction in the fluid viscosity resulting in a less than desirable fracture length in the fracture being created.

On the other hand, gelled fluids that break too slowly can cause slow recovery of the fracturing fluid and a delay in resuming the production of formation fluids. Additional problems can result, such as the tendency of proppant to become dislodged from the fracture, resulting in a less than desirable closing and decreased efficiency of the fracturing operation.

For purposes of the present application, premature breaking will be understood to mean that the gel viscosity becomes diminished to an undesirable extent before all of the fluid is introduced into the formation to be fractured.

Optimally, the fracturing gel will begin to break when the pumping operations are concluded. For practical purposes, the gel should be completely broken within a specific period of time after completion of the fracturing period. At higher temperatures, for example, about 24 hours is sufficient. A completely broken gel will be taken to mean one that can be flushed from the formation by the flowing formation fluids or that can be recovered by a swabbing operation. In the laboratory setting, a completely broken, non-crosslinked gel is one whose viscosity is either about 10 centipoises or less as measured on a Model 50 Fann viscometer R1/B1 at 300 rpm or less than 100 centipoises by Brookfield viscometer spindle #1 at 0.3 rpm.

By way of comparison, certain gels, such as those based upon guar polymers, undergo a natural break without the intervention of chemical additives. The break time can be excessively long, however. Accordingly, to decrease the break time of gels used in fracturing, chemical agents are incorporated into the gel and become a part of the gel itself. Typically, these agents are either oxidants or enzymes that operate to degrade the polymeric gel structure.

However, obtaining controlled breaks using various chemical agents, such as oxidants or enzymes, has proved difficult. Common oxidants are ineffective at low temperature ranges from ambient temperature to 130° F. The common oxidants require either higher temperatures to cause homolytic cleavage of the peroxide linkage or a coreactant to initiate cleavage. Common oxidants do not break the polysaccharide backbone into monosaccharide units. The breaks are nonspecific, creating a mixture of macromolecules. Further, common oxidants are difficult to control because they not only attack the polymer, but they also react with any other molecule that is prone to oxidation. Oxidants can react, for example, with the tubing and linings used in the oil industry, as well as, resins on resin coated proppants.

Enzymes, on the other hand, are catalytic and substrate specific and will catalyze the hydrolysis of specific bonds on the polymer. Using enzymes for controlled breaks circumvents the oxidant temperature problems, as the enzymes are effective at the lower temperatures. An enzyme will degrade many polymer bonds in the course of its useful lifetime. Unfortunately, enzymes operate under a narrow pH range and their functional states are often inactivated at high pH values. Conventional enzymes used to degrade galactomannans have maximum catalytic activities under mildly acidic to neutral conditions (pH 5 to 7). Activity profiles have indicated that the enzyme retains little to no activity past this point. Enzymatic activity rapidly declines after exceeding pH 8.0 and denatures above pH 9.0. In the case of borate crosslinked guar gels, the gels are also pH dependant requiring pH in excess of 8.0 to initiate gellation. As the pH increases, the resulting gel becomes stronger. Normally, when enzymes are used with borate crosslinked fluids these gels are buffered to maintain a pH range of 8.2 to 8.5 to ensure both gellation and enzymatic degradation. This technique requires high concentrations of both borate and enzyme. Unfortunately, while ensuring good breaks, the initial gel stability and proppant transport capability is weakened. The determination of the optimum enzyme concentration is a compromise between initial gel stability and an adequate break.

Because most guar polymers are crosslinked at pH values between 9.5 and 11.0 for fracturing applications, a need exists for a breaker that can degrade guar-based fracturing fluids within that range, such as at pH ranges ≧10.5. A need also exists for a gel system for a well fracturing operation that can break the gel polymers within a wide range of pH values at low to moderate temperatures without interfering with the crosslinking chemistry. It would be advantageous to provide an enzyme breaker system for a gelled fracturing fluid that produces a controlled break over a wide pH range and at low temperatures and that decreases the amount and size of residue left in the formation after recovery of the fluid from the formation.

SUMMARY OF THE INVENTION

In view of the foregoing, methods and compositions for fracturing subterranean formations are provided that effectively hydrolyze fracturing fluids, particularly at elevated pH values. The methods and compositions for fracturing subterranean formations use enzyme breakers that are effective at elevated pH values.

As an embodiment of the present invention, a method of fracturing a subterranean formation that is penetrated by a well bore is provided. In this embodiment, a crosslinked polymer gel is provided that includes an aqueous fluid, a hydratable polymer, a crosslinking agent capable of crosslinking the hydratable polymer, and an enzyme breaker comprising an alkaline β-mannanase. The crosslinked polymer gel is then pumped to a desired location within the well bore under sufficient pressure to fracture the surrounding subterranean formation. Once the fracturing is complete, the enzyme breaker is allowed to degrade the crosslinked polymer gel so that it can be recovered or removed from the subterranean formation. The enzyme breaker is catalytically active and temperature stable in a temperature range of about 60° F. to about 225° F.

Another method of fracturing a subterranean formation that surrounds a well bore is provided as another embodiment of the present invention. In this embodiment, a crosslinked polymer gel is formed that includes an aqueous fluid, a hydratable polymer, a crosslinking agent capable of crosslinking the hydratable polymer and an enzyme breaker comprising alkaline β-mannanase. Once the crosslinked polymer gel is formed, it is pumped to a desired location within the well bore under sufficient pressure to fracture the surrounding subterranean formation. The enzyme breaker is allowed to degrade the crosslinked polymer gel so that it can be recovered or removed from the subterranean formation. The enzyme breaker is catalytically active and temperature stable in a temperature range of about 60° F. to about 225° F. and in a pH range of about 7 to about 12, with the maximum catalytic activity at pH 10.5-11.5.

Besides the method embodiments, compositions are also provided as embodiments of the present invention. As another embodiment of the present invention, a fracturing fluid composition is provided. The fracturing fluid comprises an aqueous fluid, a hydratable polymer, a crosslinking agent capable of crosslinking the hydratable polymer, and an enzyme breaker comprising an alkaline β-mannanase. As with the other embodiments, the enzyme breaker is catalytically active and temperature stable in a temperature range of about 60° F. to about 225° F. and in a pH range of about 7 to about 12, with the maximum catalytic activity at pH 10.5-11.5.

In embodiments of the present invention, the enzyme breaker used in the methods and compositions described herein is derived from a gene having engineered restriction endonuclease sites, such as Xho1 and Bcl1, flanking the 5' and the 3' ends of the gene coding for the alkaline β-mannanase enzyme. In an aspect, the gene is codon optimized for expression in $E.\ coli$. In another aspect, the gene produces a GST-mannanase fusion protein.

BRIEF DESCRIPTION OF THE DRAWINGS

FIG. 1A is the sequence of the gene that is codes for the enzyme breaker made in accordance with embodiments of the present invention;

FIG. 1B is a comparison of the gene sequence of FIG. 1A with the gene sequence of a gene coded for a prior art enzyme;

Figure 2:
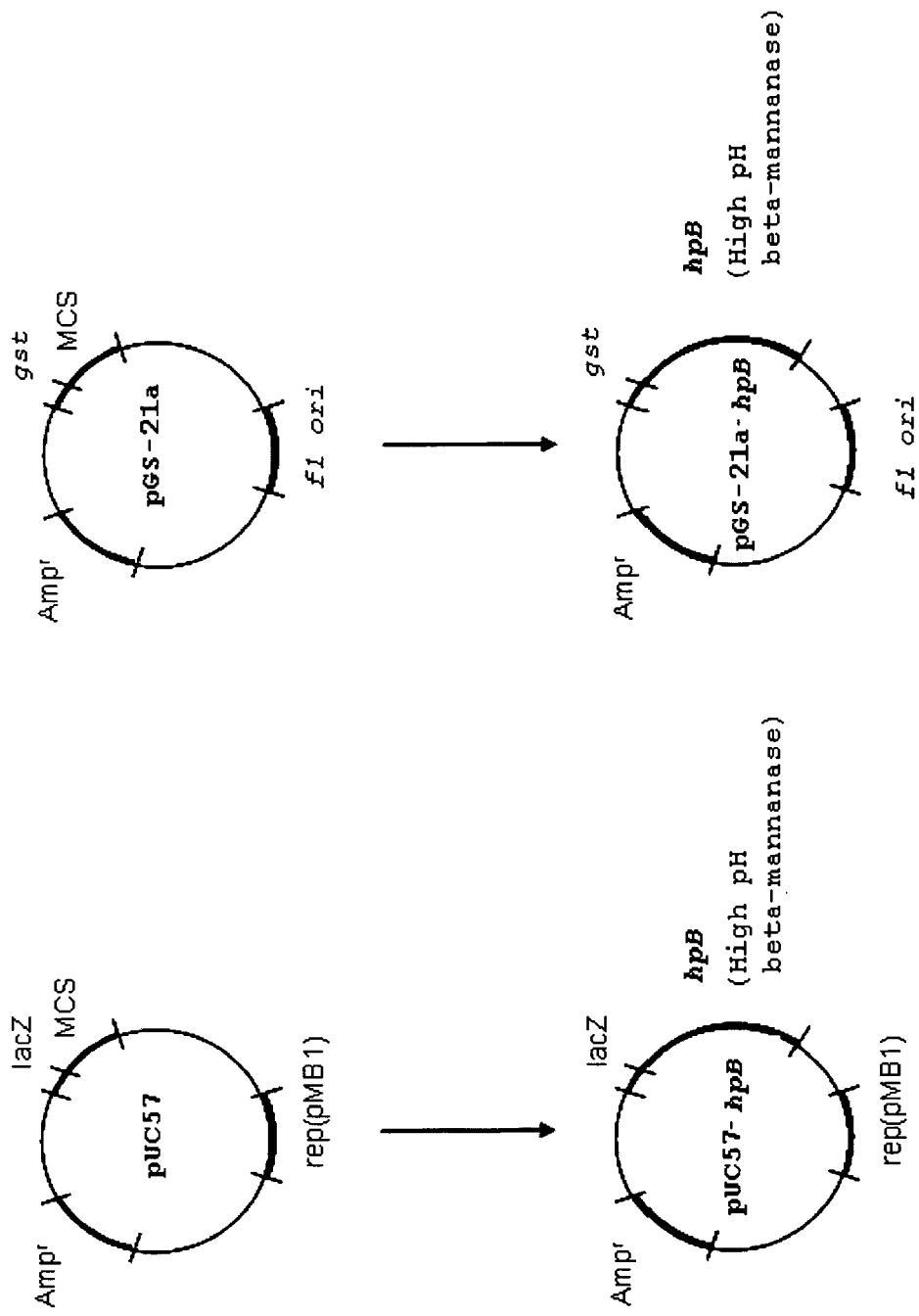
FIG. 2 is a schematic illustrating the creation of the plasmids pGS-21a-hpβ and pUC57-hpβ used in the enzyme breaker in accordance with embodiments of the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the intention is to cover all modifications, equivalents and alternatives falling within the spirit and scope of the invention as defined by the appended claims.

DESCRIPTION OF ILLUSTRATIVE EMBODIMENTS

Illustrative embodiments of the invention are described below as they might be employed in the operation and in the treatment of oilfield applications. In the interest of clarity, not all features of an actual implementation are described in this specification. It will of course be appreciated that in the development of any such actual embodiment, numerous implementation-specific decisions must be made to achieve the developers' specific goals, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments of the invention will become apparent from consideration of the following description.

As an embodiment of the present invention, a method of fracturing a subterranean formation that surrounds a well bore is provided. In this embodiment, a crosslinked polymer gel is provided that includes an aqueous fluid, a hydratable polymer, a crosslinking agent capable of crosslinking the hydratable polymer and an enzyme breaker comprising an alkaline β-mannanase. The crosslinked polymer gel is then injected to a desired location within the well bore and into contact with the formation under sufficient pressure to fracture the surrounding subterranean formation. Once the fracturing is complete, the enzyme breaker is allowed to degrade the crosslinked polymer gel so that it can be recovered or removed from the subterranean formation. The enzyme breaker is catalytically active and temperature stable in a temperature range of about 60° F. to about 225° F.

Another method of fracturing a subterranean formation that surrounds a well bore is provided as another embodiment of the present invention. In this embodiment, a gelled fluid is formed by combining an aqueous fluid, a hydratable polymer, and an enzyme breaker comprising an alkaline β-mannanase. A crosslinking agent capable of crosslinking the gelled fluid is then added to form a crosslinked polymer gel having sufficient viscosity to facilitate fracturing of the formation. Once the crosslinked polymer gel is formed, it is injected to a desired location within the well bore and into contact with the formation under sufficient pressure to fracture the surrounding subterranean formation. The enzyme breaker is allowed to degrade the crosslinked polymer gel so that it can be recovered or removed from the subterranean formation. The enzyme breaker is catalytically active and temperature stable in a temperature range of about 60° F. to about 225° F. and in a pH range of about 7 to about 12, with the maximum catalytic activity at pH 10.5-11.5.

Besides the method embodiments, compositions are also provided as embodiments of the present invention. As another embodiment of the present invention, a fracturing fluid composition is provided. The fracturing fluid comprises an aqueous fluid, a hydratable polymer, a crosslinking agent capable of crosslinking the hydratable polymer, and an enzyme breaker comprising an alkaline β-mannanase. As with the other embodiments, the enzyme breaker is catalytically active and temperature stable in a temperature range of about 60° F. to about 225° F. and in a pH range of about 7 to about 12, with the maximum catalytic activity at pH 10.5-11.5.

The enzyme breaker of the present invention comprises an alkaline β-mannanase. In an aspect, the enzyme breaker is derived from a gene from the alkaliphilic *Bacillus* sp. N16-5. The enzyme breaker of the present invention can be prepared in accordance with the methods described in Example 1 of this specification. In another aspect, the enzyme breaker is a member of the glycosyl hydrolase family 5 and is an active β-mannanase. The enzyme breaker of the present invention catalyzes the random hydrolysis of β-(1,4) mannosidic linkages and can be used to break the polymer backbone of galactomannan polymers. Unlike the conventional enzyme prior art products, the enzyme breaker of the present invention does not require the action of an associated α-galactosidase in order to function.

In embodiments of the present invention, the enzyme breaker is derived from a gene having engineered restriction endonuclease sites, such as Xho1 and Bcl1, flanking the 5' and the 3' ends of the gene coding for the β-mannanase enzyme. In an aspect, the gene is codon optimized for expression in *E. coli*. In another aspect, the gene codes for an expressed N-terminal GST fusion protein.

The enzyme breaker can be diluted in various concentrations that are effective and convenient for use in fracturing jobs. In an aspect, the enzyme breaker of the present invention is diluted to a concentration of about 1:24 and is present in the crosslinked polymer gel in a range of about 0.25 gpt to about 4 gpt; alternatively, in a range of about 0.5 gpt to about 2.5 gpt; alternatively, in a range of about 0.5 gpt to about 1 gpt; or alternatively, in a range of about 1 gpt to about 2 gpt. Other suitable dilution concentrations and amounts of enzyme breaker will be apparent to those of skill in the art and are to be considered within the scope of the present invention. In an aspect, the total protein concentration of the stock enzyme breaker from which the dilutions are made is greater than 1 mg/mL.

Conventional enzymes used to degrade galactomannans work well in environments having a pH value between 4.0 and 8.0. At elevated pH ranges (>pH 10.0) these enzymes quickly denature and lose activity. The typical β-mannanase enzyme has a pH optimum of ~5.0. This would suggest that the enzyme loses >90% of its activity at pH values greater than 8.0. Since most guar polymers are crosslinked at pH values between 9.5 and 11.0 for fracturing applications, it is beneficial to have an enzyme that can degrade guar under elevated pH conditions without an additional step to reduce the pH first.

As indicated herein, the enzyme breaker of the present invention can be used in a wide range of temperatures and pH values. In an aspect, the enzyme breaker of the present invention can be used in applications having a temperature that ranges from about 60° F. to about 225° F.; or alternatively, in a range from about 120° F. to about 225° F. In yet another aspect, the enzyme breaker can be catalytically active and temperature stable in a pH range of about 7 to about 12; alternatively, in a range of about 9.5 to about 11.5; or alternatively, in a range from about 10.5 to about 11.

In an aspect, the enzyme breaker of the present invention can include an alkaline enzyme. As used herein, the term "alkaline enzyme" generally refers to enzymes that display their maximum catalytic activity somewhere within a pH range of about 8.0 to about 14.0. In an aspect, the maximum catalytic activity of the alkaline enzyme can be at pH values above 9.0. In an aspect, the alkaline enzyme is derived from an alkaliphilic organism. As used herein, the term "alkaliphilic organism" generally refers to extremophilic organisms that thrive in alkaline conditions somewhere in the pH range of about 8.0 to about 14.0.

The methods and compositions described herein can be used with a variety of hydratable polymers. In an aspect, the hydratable polymer has repeating units of mannose linked by β-(1,4) mannosidic linkages. In another aspect, the hydratable polymer comprises guar, guar derivatives, cellulose derivatives, water soluble biopolymers, or combinations thereof. Other suitable types of hydratable polymers that can be used in the methods and compositions described herein will be apparent to those of skill in the art and are to be considered within the scope of the present invention.

Because the enzyme breaker of the present invention has a maximum activity under alkaline pH ranges, it can be combined with other breakers that operate in different pH ranges to allow for better control of hydrolysis of fracturing fluids over a much greater pH range. In an aspect, the crosslinked polymer gel can further include a second enzyme breaker that is catalytically active and temperature stable in a pH range of about 4 to about 8. Suitable enzymes that can be used include those described in U.S. Pat. No. 5,201,370, which is hereby incorporated by reference in its entirety Divalent cations can affect the activity of the enzyme breaker of the present invention, as shown and described in Example 5. In an aspect, the crosslinked polymer gel can further include a divalent cation. Suitable divalent cations can include $Mg^{2+}$, $Co^{2+}$, or $Me^{2+}$. Other suitable divalent cations that can be used in the present invention will be apparent to those of skill in the art and are to be considered within the scope of the present invention.

The methods and compositions described herein can be used with a wide variety of crosslinking agents. A suitable crosslinking agent can be any compound that increases the viscosity of the hydratable polymer by chemical crosslinking, physical crosslinking, or any other mechanisms. For example, the gellation of the hydratable polymer can be achieved by crosslinking the hydratable polymer with metal ions including borate compounds, zirconium compounds, titanium compounds, aluminum compounds, antimony compounds, chromium compounds, iron compounds, copper compounds, zinc compounds, or mixtures thereof. One class of suitable crosslinking agents is zirconium-based crosslinking agents. Suitable crosslinking agents can include zirconium oxychloride, zirconium acetate, zirconium lactate, zirconium malate, zirconium glycolate, zirconium lactate triethanolamine, zirconium citrate, a zirconate-based compound, zirconium triethanolamine, an organozirconate, or combinations thereof. XLW-14 is a particularly suitable zirconate-based crosslinking agent that is commercially available from BJ Services Company and described in U.S. Pat. No. 4,534,870, which is incorporated by reference in its entirety. Suitable borate-containing crosslinking agents can include, for example, alkaline earth metal borates, alkali metal-alkaline earth borates, probertite, ulexite, nobleite, frolovite, colemanite, calcined colemanite, priceite, pateroniate, hydroboractie, kaliborite, or combinations thereof. Suitable titanium-containing crosslinking agents can include, for example, titanium lactate, titanium malate, titanium citrate, titanium ammonium lactate, titanium triethanolamine, titanium acetylacetonate, or combinations thereof. Suitable aluminum-containing crosslinking agents can include, for example, aluminum lactate, aluminum citrate, or combinations thereof. Other suitable crosslinking agents that are compatible with the compositions and methods described herein will be apparent to those of skill in the art and are to be considered within the scope of the present invention.

Besides the polymers, crosslinking agents, and enzyme breakers described herein, various additives can be useful in the present invention. Additives used in the oil and gas industry and known in the art, including but not limited to, corrosion inhibitors, non-emulsifiers, iron control agents, delay additives, silt suspenders, flowback additives, proppants, and gel breakers, can also be used in embodiments of the present invention. Other suitable additives useful in the present invention will be apparent to those of skill in the art and are to be considered within the scope of the present invention.

The amount of crosslinking agent and other additives used in the present invention can vary depending upon the desired effect of the additives. For example, the crosslinking agent can be present in the crosslinked polymer gel in an amount sufficient to provide the desired degree of crosslinking between molecules within the hydratable polymer. The amounts of additives that can be used in the present invention will be apparent to those of skill in the art and are to be considered within the scope of the present invention.

As an advantage of the present invention, less enzyme breaker of the present invention can be used, when compared with conventional prior art enzymes. The reduction in the amount of enzyme breaker needed results in a cost savings in terms of enzyme production, shipping, and storage.

EXAMPLES

The following examples are included to demonstrate the use of compositions in accordance with embodiments of the present invention. It should be appreciated by those of skill in the art that the techniques disclosed in the examples that follow represent techniques discovered by the inventors to function well in the practice of the invention. However, those of skill in the art should, in light of the present disclosure, appreciate that many changes can be made in the specific embodiments that are disclosed and still obtain a like or similar result without departing from the scope of the invention.

Example 1

A novel β-mannanase enzyme was first isolated in the alkaliphilic extremophile, *Bacillus* sp. N16-5 (see Ma et al. (2004) Characterization and Gene Cloning of a Novel β-mannanase from Alkaliphilic *Bacillus* sp. N16-5, *Extremophiles* 8, 447-454). The gene coding this β-mannanase was sequenced and the sequence data deposited in the NCBI (National Center for Biotechnology Information) PubMed database under the accession number AY534912. This gene structure was shown to code for a 50.7 kDa protein with a 32 amino acid signal sequence that was post-tranlationaly processed. The smaller, mature form of the enzyme was found to be secreted from the microorganism into the extracellular environment.

To prepare the enzyme breaker of the present invention, the gene structure coding for the β-mannanase enzyme isolated by Ma et al. was reengineered to remove the portion coding for the protein signal sequence in an attempt to produce a gene product with more stability, activity and yield than its wild type precursor isolated by Ma et al. Additionally, the gene sequence was codon optimized for expression in *E. coli* using GenScript's Codon Optimization algorithm to increase the efficiency of its expression in *E. coli*. Finally, Xho1 and Bcl1 restriction endonuclease sites were engineered into the 5' and 3' ends of the gene, respectively. The gene, N16-5, used in the enzyme breaker of the present invention has a 75% identical sequence with the wild type β-mannanase gene, as shown in FIGS. 1A and 1B. In FIG. 1B, the top line of the gene sequence is that of a prior art gene made in accordance with methods taught by Ma et al and the second line of the gene sequence is that of the enzyme breaker of the present invention. The gene sequences for the wild-type gene and the optimized gene were aligned with the ClustalW sequence alignment algorithm so that a comparison could be made on a line-by-line basis of the two genes. The gene of the present invention, designated hpβ, was cloned into the expression vector pGS-21a and the cloning vector pUC57. This created two new plasmids, pGS-21-hpβ and pUC57-hpβ, which are shown in FIG. 2. Amp$^r$ codes for a β-lactamase, rep(pMB1) and f1 ori represent the origin of replication in their respective vectors, and MCS represents the Multiple Cloning Site. The coding region for the GST fusion site is represented by the gene gst. The pGS-21a expression vector contains a region coding for glutathione S-transferase (GST) protein that can be used to help purify the β-mannanase. The resultant gene product is a GST-mannanase fusion protein.

The plasmids pGS-21a-hpβ and pUC57-hpβ were transformed into competent BL21 (DE3) *E. coli* and cultured in 5 mL LB-Miller nutrient media at 98.6° F. at 200 RPM for 16 hours. The culture broth was supplemented with 100 ug/mL ampicillan that was used as an inoculum for a 100 mL culture of *E. coli* harboring the plasmids pGS-21a-hpβ and pUC57-hpβ. The cultures were grown at 104° F. and 200 RPM. After 4 hours, isopropyl-β-D-thiogalactopyranoside (IPTG) was added to the culture to a final concentration of 0.1 mM. After 3 hours of incubation in the presence of IPTG, the cells were chilled to 39° F. and harvested by centrifugation. The culture medium was then discarded and the cells stored at −4° F. until use.

Cells were thawed and resuspended in 5 mLs chilled 50 mM sodium phosphate buffer. Lysozyme was added to a final concentration of 1 mg/mL and the culture was incubated at room temperature for 30 minutes. Nucleic acids were disrupted by brief pulses of sonication. The resultant cell free extract (CFX) was then passed through a GST high-affinity resin (Genscript) following manufacturer's directions. Eluted fractions were pooled, concentrated, and dialyzed into 20 mM 2-(n-cyclohexylamino)ethane sulfonic acid (CHES) buffer, pH 9.0. Enzyme purity was estimated by sodium dodecyl sulfate polyacrylamide gel electrophoresis (SDS-PAGE) and found to be ≧95% pure.

The plasmid pUC57-hpβ was transformed into competent DH5α $E.$ $coli$ and cultured in TYE nutrient media at 30° C. at 200 RPM for 40 hours. The culture broth was supplemented with 50 ug/mL ampicillan and 4% glycerol. After 16 hours, fresh ampicillan was added to the culture broth. After 40 hours of incubation, the cells were chilled to 4° C. and harvested by centrifugation at 3,000 rpm for 20 minutes. The culture medium was then discarded and the cells stored at −20° C. until use.

Cells were resuspended in 4.5 times (w/v) chilled 50 mM sodium phosphate buffer, pH 8.0 and sonicated on ice for three minutes. Cell debris was removed by centrifugation and the supernatant was retained for tests.

In a comparative study, cells were sonicated as above and the sonicate (cell extract) was used as the enzyme sample in Examples 2 and 3.

Example 2

Figure 3:
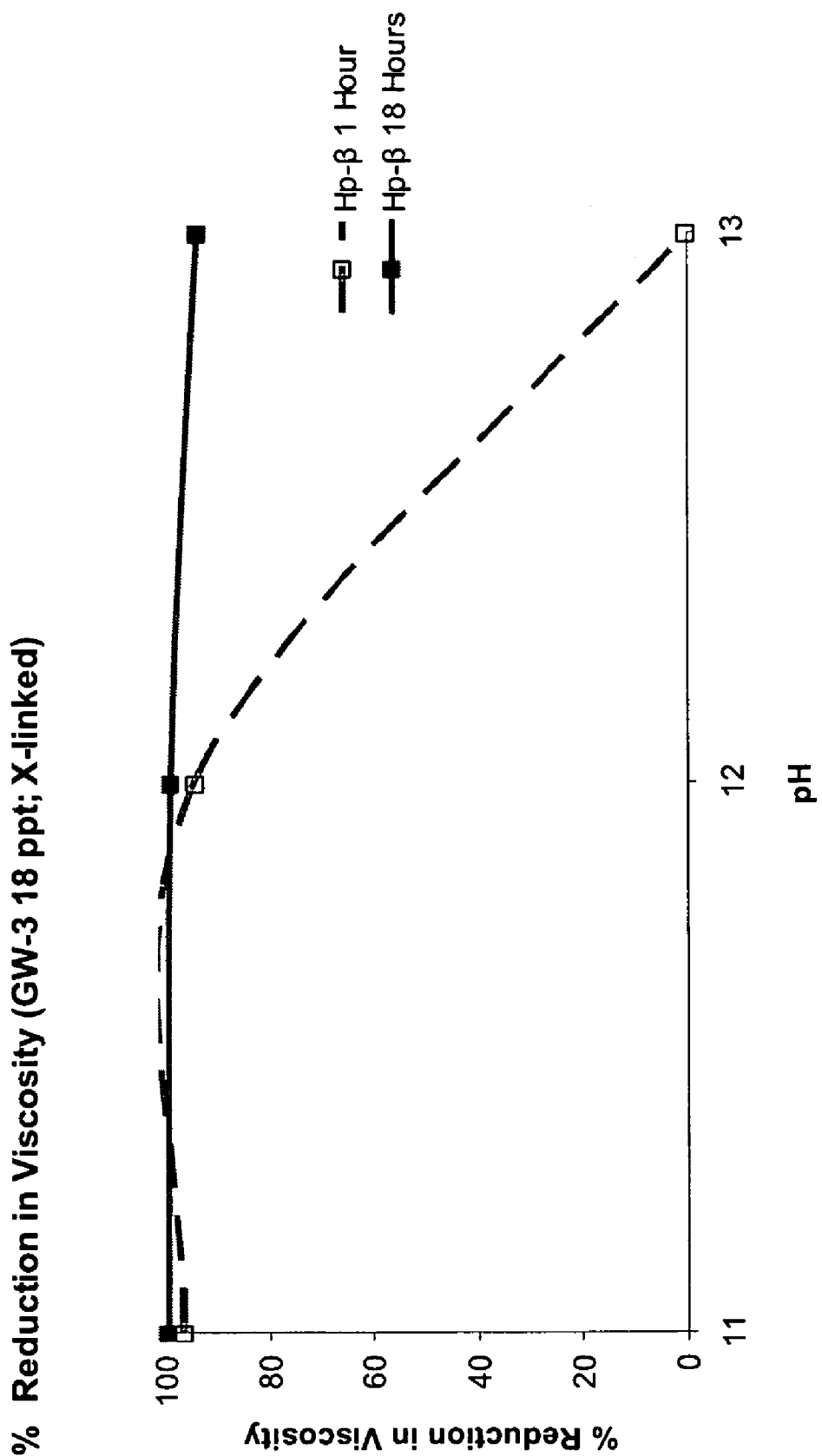
FIG. 3 is a graph that illustrates the degradation in the viscosity of 18 ppt crosslinked guar GW-3 after 1 hour and 18 hours at pH values 11.0, 12.0, and 13.0 by the enzyme breaker made in accordance with embodiments of the present invention.
Figure 4:
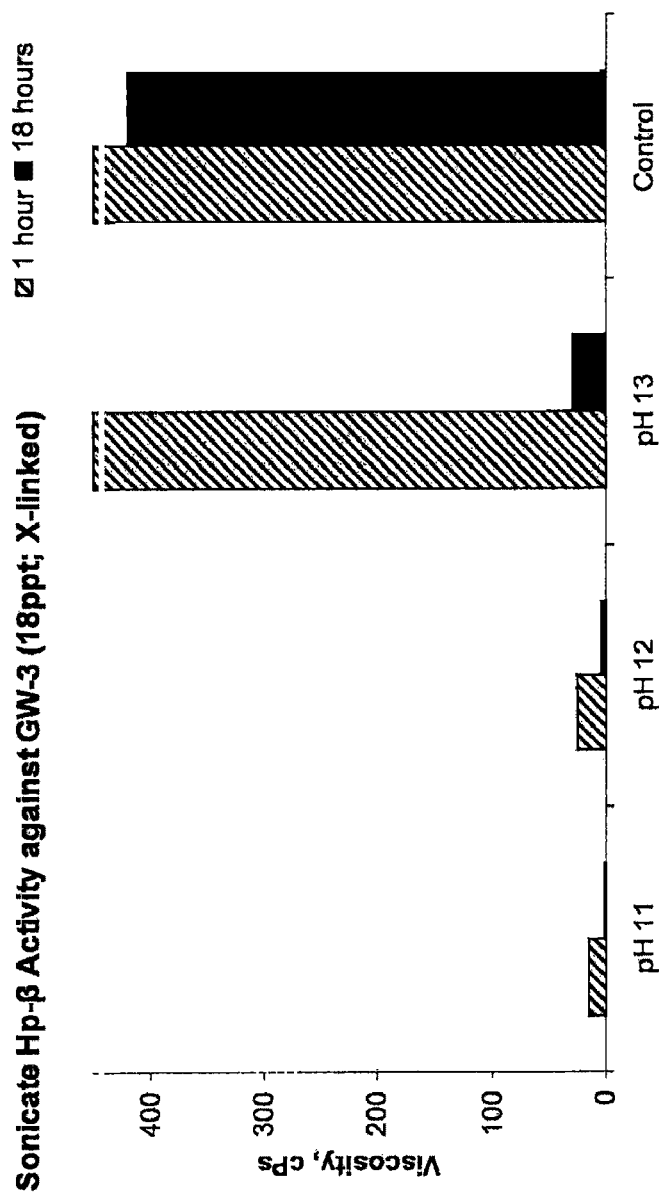
FIG. 4 is a bar graph that illustrates the degradation in the viscosity of 18 ppt crosslinked guar GW-3 after 1 hour and 18 hours at pH values 11.0, 12.0, and 13.0 comparing the crosslinked guar GW-3 having no enzyme breaker and the crosslinked guar GW-3 having the enzyme breaker made in accordance with embodiments of the present invention.

In this Example, the ability of the enzyme breaker of the present invention to hydrolyze the polymannan backbone of the guar polymer was examined. As shown in FIGS. 2, 3, and 4, the enzyme breaker of the present invention, Enzyme Hp-β, comprising the alkaline β-mannanase effectively hydrolyzes the guar polymer at elevated pH ranges. Enzyme Hp-β can be used as a standalone product to degrade high pH guar gels or in combination with the existing conventional enzyme products to degrade guar gels over a much broader pH range.

The Hp-β enzyme was tested against crosslinked guar polymer gels at pH 11.0, 12.0 and 13.0 using 18 ppt (pounds per thousand pounds fluid) guar polymer GW-3 that is commercially available from BJ Services Company. The viscosity of each of these polymer gels was measured at 1 hour and at 18 hours to observe degradation in the viscosity. As can be seen in FIGS. 3 and 4, the alkaline β-mannanase of the present invention provides almost complete reduction in the viscosity of the guar after 18 hours across all pH ranges tested. Without enzyme, the fluid does not break across all pH ranges tested. The control (no enzyme) at pH 12.0 is included for comparison purposes (FIG. 4).

Example 3

Figure 5:
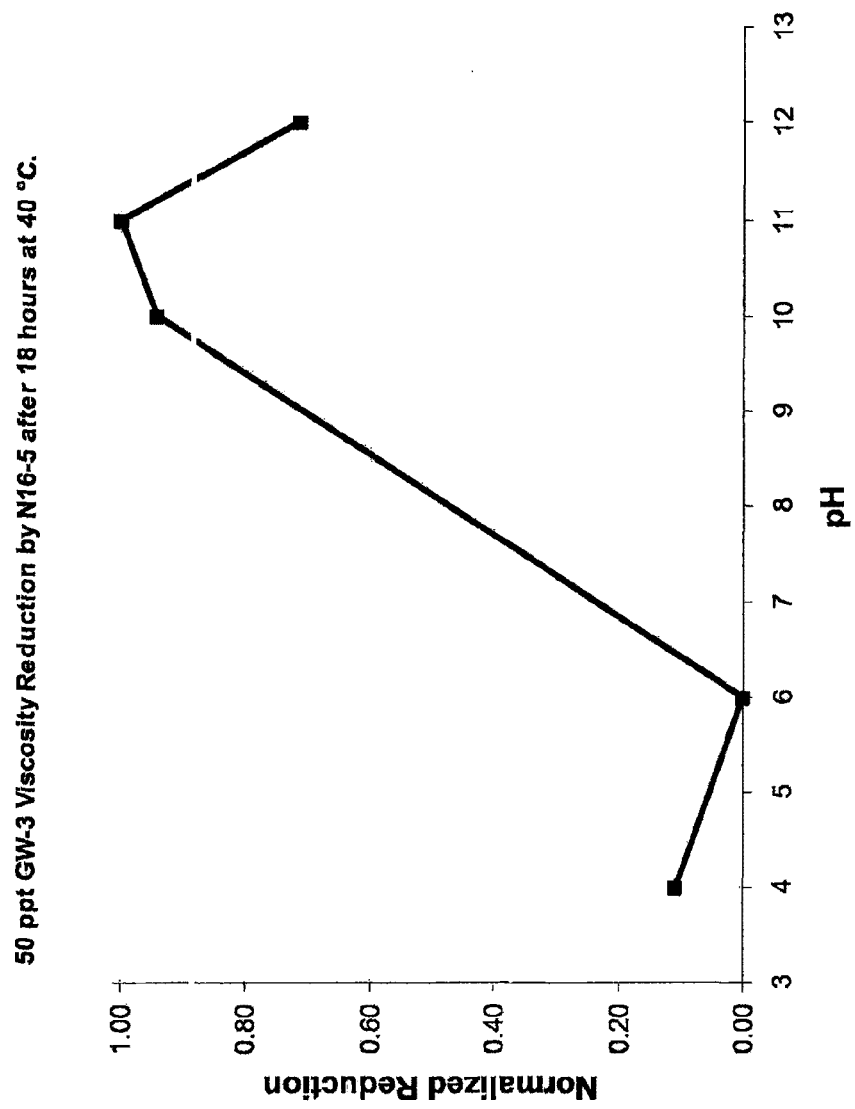
FIG. 5 is a graph that illustrates the viscosity reduction in 50 ppt non-crosslinked guar GW-3 after 18 hours using the enzyme breaker made in accordance with embodiments of the present invention.

In this Example, the activity of the enzyme breaker of the present invention Enzyme Hp-β from Example 1 was evaluated. The enzyme breaker from Example 1 was added to 50 ppt GW-3 polymer. The reduction in viscosity was measured for the GW-3 polymer in a pH range of about 4 to about 13, as shown in FIG. 5. The total reduction across the pH values is normalized to itself. As can be seen in FIG. 5, Enzyme Hp-β appears to show the greatest activity at a pH value of about 11.

Example 4

Figure 6:
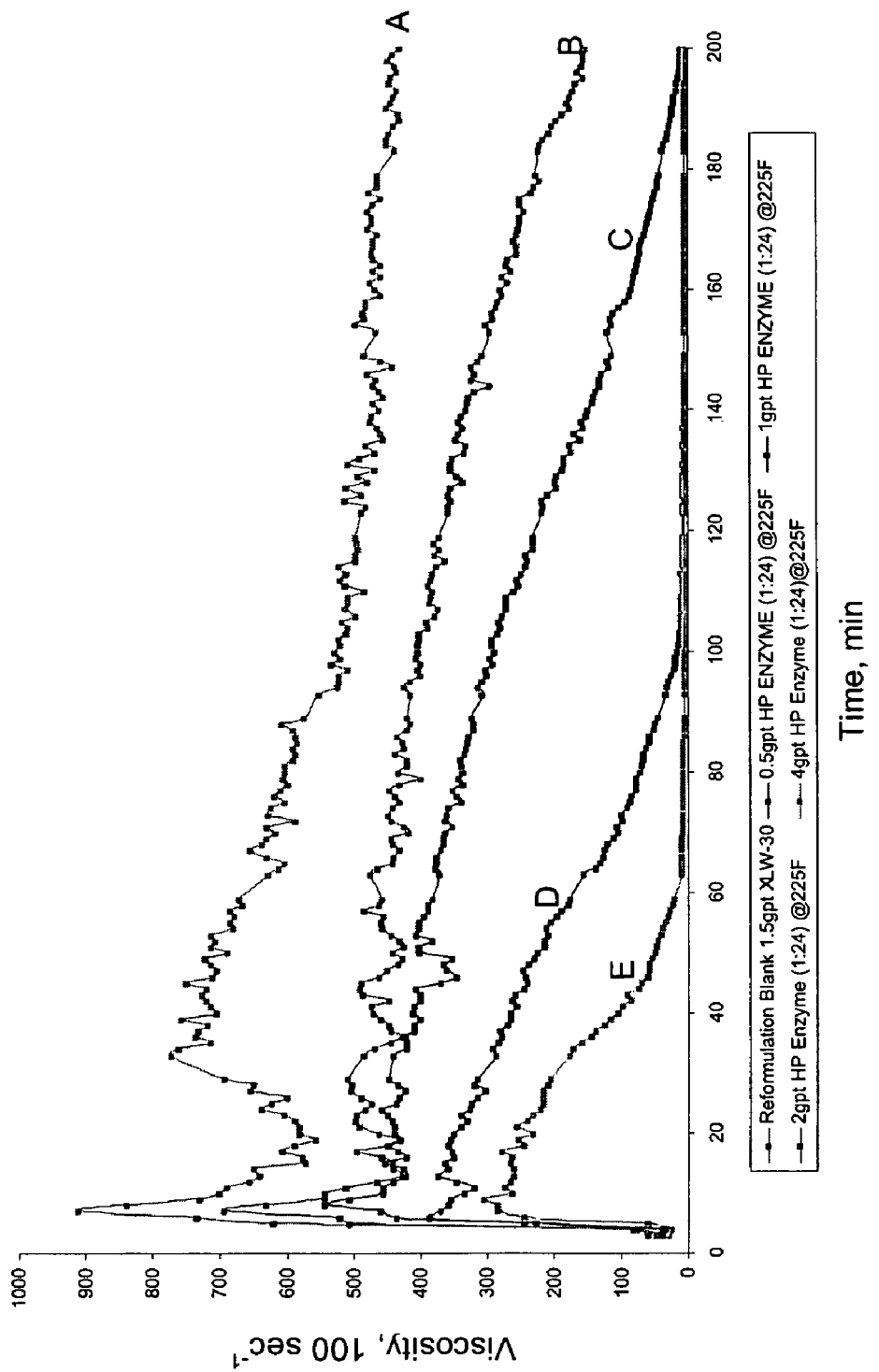
FIG. 6 is a graph that illustrates the effect on the viscosity of 30 ppt crosslinked guar GW-3 at a pH of 10.5 using different loadings of the enzyme breaker made in accordance with embodiments of the present invention.

This Example indicates that the enzyme breaker of the present invention (Enzyme Hp-β) maintains its effectiveness in a wide range of temperatures, even up to about 225° F., and in a wide range of loadings. To demonstrate the effectiveness of the enzyme breaker of the present invention at 225° F., five samples of crosslinked GW-3 polymer were prepared, each having a different loading of the enzyme breaker of the present invention contained therein. Sample A represents a crosslinked polymer having no enzyme breaker. Sample B represents a crosslinked polymer having 0.5 gpt of the diluted enzyme breaker of the present invention. Sample C represents a crosslinked polymer having 1 gpt of the diluted enzyme breaker of the present invention. Sample D represents a crosslinked polymer having 2 gpt of the diluted enzyme breaker of the present invention. Sample E represents a crosslinked polymer having 4 gpt of the diluted enzyme breaker of the present invention. As shown in FIG. 6, a loading of 0.5 gpt enzyme (Sample B) is sufficient to reduce the viscosity of the fracturing fluid to below 200 cps after approximately 3 hours. Additionally, there is no re-healing of the polymer once it cools to room temperature (data not shown). Higher loadings of enzyme have shown to be too aggressive in the degradation of the polymer leading to a rapid decrease in the viscosity of the fluid.

As shown in FIG. 6, Enzyme Hp-β is voracious and quickly reduces the viscosity of the fracturing fluid. In the event that an operator wishes to maintain a high viscosity fluid for a longer period of time, a way to slow the activity of the enzyme would be beneficial. It would be important to slow the activity of the enzyme and not hinder or abolish any of the catalytic parameters lest re-healing of the cooled polymer result.

Example 5

Figure 7:
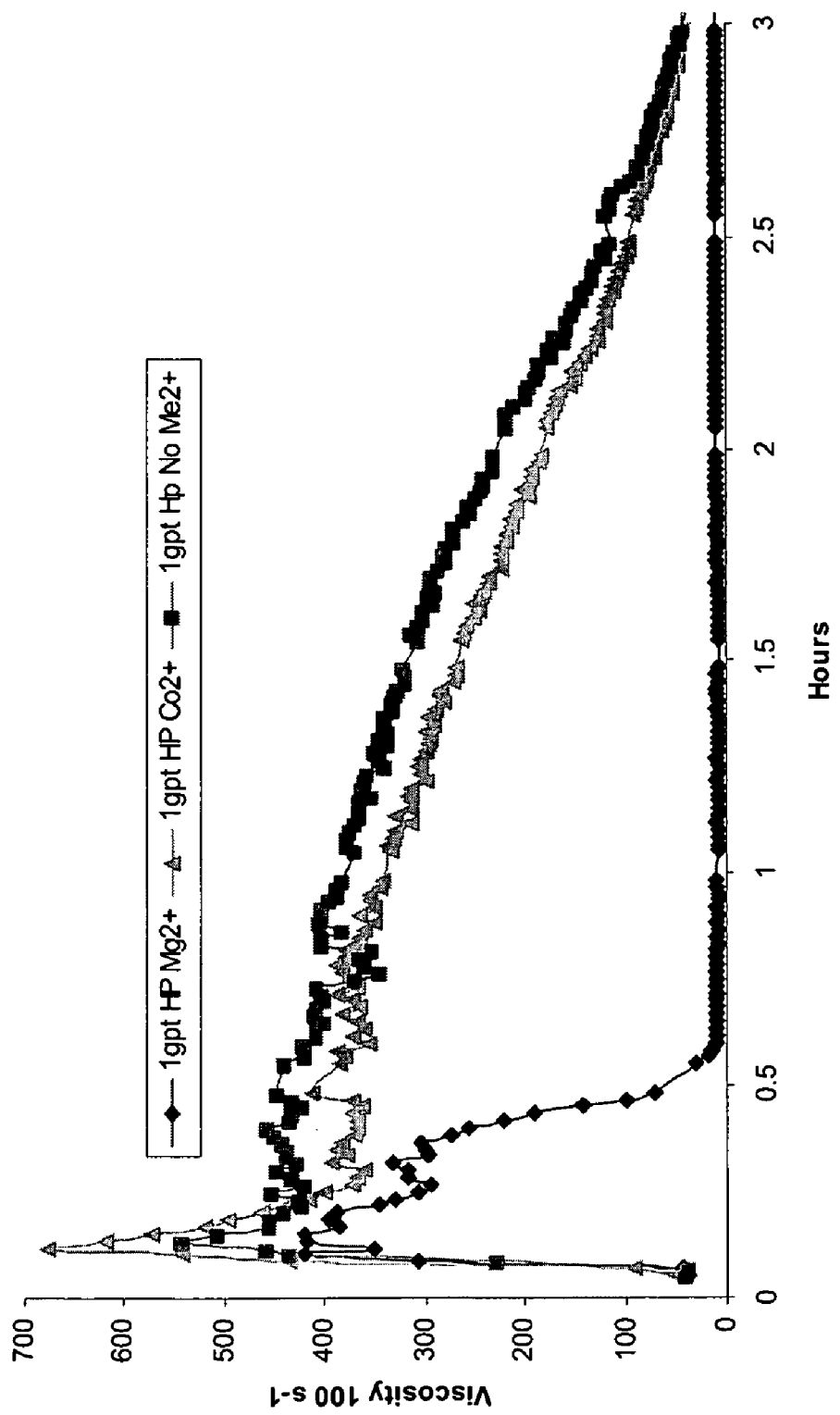
FIG. 7 is a graph that illustrates the effect on the viscosity of 30 ppt crosslinked guar GW-3 at a pH of 10.5 of adding different types of divalent cations to the enzyme breaker made in accordance with embodiments of the present invention.

Divalent cations can have beneficial or detrimental effects on the activity of the enzyme breakers of the present invention. As previously reported in Ma et al. (2004) Characterization and Gene Cloning of a Novel β-mannanase from Alkaliphilic $Bacillus$ sp. N16-5, $Extremophiles$ 8, 447-454, 1.0 mM $Mg^{2+}$ has the effect of increasing Enzyme Hp-β's activity while the presence of 1.0 mM $Co^{2+}$ decreases enzyme activity. Enzyme Hp-β was incubated in the presence of 1.0 mM of each of the divalent cations and the activity of the samples was measured against crosslinked 30 ppt GW-3, pH 10.5. As shown in FIG. 7, Enzyme Hp-β has a dramatic increase in activity when incubated in the presence of 1.0 $Mg^{2+}$. While 1.0 mM $Co^{2+}$ does appear to have a slight decrease in the activity of the enzyme, when compared to the activity of the enzyme without the divalent cation, this effect does not appear to be very significant. Additional tests are required to confirm or deny this result. There are also additional metal ions that can be employed to reduce the activity of the enzyme. Currently, the use of divalent cations to increase or reduce the rate of catalysis appears promising.

Example 6

Figure 8:
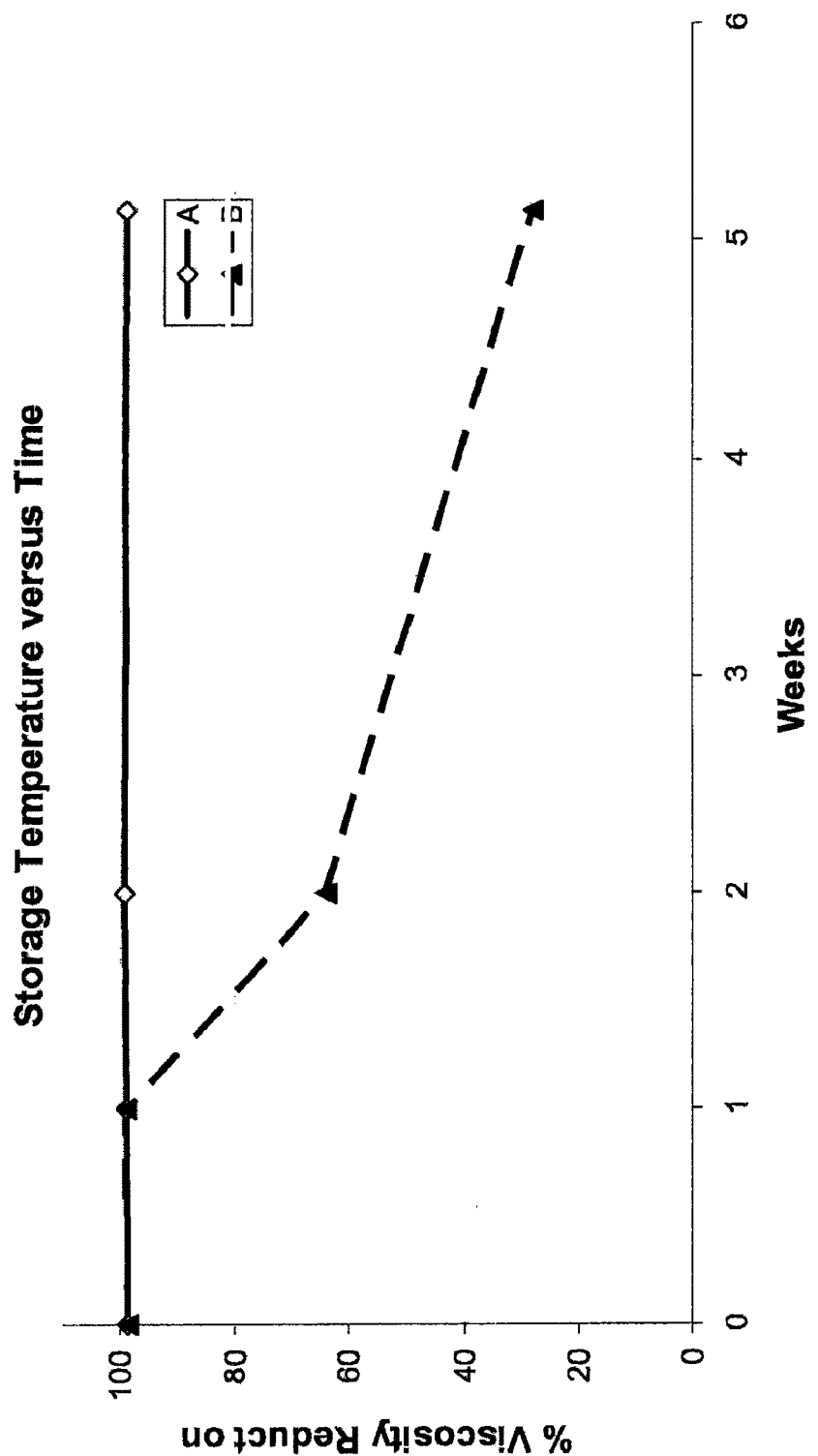
FIG. 8 is a graph that illustrates the shelf-life of enzyme breaker made in accordance with the embodiments of the present invention, wherein the enzyme breaker was stored at various concentrations and temperatures and its activity reported with respect to time.

To compare the stability of the enzyme breaker of the present invention, several enzyme samples were prepared and compared. The results are shown in FIG. 8. Sample A represents data for 1.0 mg/mL Enzyme Hp-β samples stored at 40° F. and 72° F., and 5.0 mg/mL Enzyme Hp-β samples stored at 40° F., 72° F., and 120° F. In all cases the data was the same. Sample B represents data for 1.0 mg/mL Enzyme Hp-β samples stored at 120° F. To measure enzyme activity, incubated enzyme samples were diluted so that the final, working concentration of Enzyme Hp-β samples was 0.4 ng $mL^{-1}$ (nanograms/milliliter). Enzymes were incubated at 102° F. in the presence of crosslinked 20 ppt GW-3, pH 10.5, for 16 hours. After 16 hours, sample viscosities were measured on a Fann 35 after solutions were allowed to cool to room temperature for at least 60 minutes to allow rehealing of the crosslinked polymer.

Typically, the more concentrated an enzyme solution is, the longer it maintains its conformational stability and, thus, its activity. Enzyme stocks of varying concentrations were prepared and stored at various temperatures as described in this Example and shown in FIG. 8. Highly concentrated Enzyme Hp-β (Sample A) showed remarkable stability, even after storage of 2 weeks at 120° F. as evidenced by no observable decrease in activity. Even the 1 mg/mL stock of Enzyme Hp-β (Sample B) was stable over the course of two weeks. However, there was an observable decrease in activity of the sample stored at 120° F. This result was not unexpected as an increase in temperature leads to a larger increase in the conformational entropy of the enzyme in dilute solutions as compared to those in concentrated solutions. Over time, this leads to larger populations of unfolded (and inactive) states in the enzyme sample.

The enzyme breaker of the present invention, Enzyme Hp-β, appears to be the most stable when stored as a highly concentrated stock solution (>5 mg/mL). To increase longevity of the enzyme in transit and/or storage, the concentration of the stock solution of Enzyme Hp-β should be >5.0 mg/mL.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations can be applied to the compositions and/or methods and in the steps or in the sequence of steps of the methods described herein without departing from the concept, spirit and scope of the invention. More specifically, it will be apparent that certain agents that are chemically related can be substituted for the agents described herein while the same or similar results would be achieved. All such similar substitutes and modifications apparent to those skilled in the art are deemed to be within the scope and concept of the invention.

What is claimed is:

1. A method of fracturing a subterranean formation penetrated by a well bore, the method comprising the steps of:

a. providing a crosslinked polymer gel comprising an aqueous fluid, a hydratable polymer, a crosslinking agent capable of crosslinking the hydratable polymer, and an enzyme breaker comprising an alkaline β-mannanase derived from an alkaliphilic *Bacillus* sp. N16-5 gene, the gene being codon optimized for expression in *E. coli*, a GST-mannanase fusion protein, having engineered restriction endonuclease sites flanking the 5' and 3' ends of the gene coding for the alkaline β-mannanase, or combinations thereof;

b. injecting the crosslinked polymer gel into the well bore and into contact with the formation under sufficient pressure to fracture the surrounding subterranean formation; and c. allowing the enzyme breaker to degrade the crosslinked polymer gel so that it can be removed from the subterranean formation, the enzyme breaker being catalytically active and temperature stable in a temperature range of about 60° F. to about 225° F.

2. The method of claim 1, wherein the hydratable polymer has repeating units of mannose linked by β-(1,4) mannosidic linkages.

3. The method of claim 1, wherein the hydratable polymer is selected from the group consisting of guar, guar derivatives, cellulose derivatives, water soluble biopolymers, or combinations thereof.

4. The method of claim 1, wherein the alkaline β-mannanase is catalytically active in a pH range of about 8 to about 14.

5. The method of claim 1, wherein the enzyme breaker has a maximum catalytic activity in a pH range of about 10.5 to about 11.5.

6. The method of claim 1, wherein the crosslinked polymer gel further comprises a second enzyme breaker that is catalytically active and temperature stable in a pH range of about 3 to about 11.

7. The method of claim 1, wherein the crosslinked polymer gel further comprises a divalent cation.

8. The method of claim 1, wherein the enzyme breaker has a total protein concentration of greater than about 1 mg/mL.

9. A method of fracturing a subterranean formation penetrated by a well bore, the method comprising the steps of:
   a. providing a crosslinked polymer gel comprising an aqueous fluid, a hydratable polymer, a crosslinking agent capable of crosslinking the hydratable polymer, and an enzyme breaker that is a member of the glycosyl hydrolase family 5 and is coded for by a gene sequence as depicted in FIG. 1A;
   b. injecting the crosslinked polymer gel into the well bore and into contact with the formation under sufficient pressure to fracture the surrounding subterranean formation; and
   c. allowing the enzyme breaker to degrade the crosslinked polymer gel so that it can be removed from the subterranean formation, the enzyme breaker being catalytically active and temperature stable in a temperature range of about 60° F. to about 225° F.

10. The method of claim 9, wherein the hydratable polymer has repeating units of mannose linked by β-(1,4) mannosidic linkages.

11. The method of claim 9, wherein the crosslinked polymer gel further comprises a second enzyme breaker that is catalytically active and temperature stable in a pH range of about 3 to about 11.

12. A method of fracturing a subterranean formation that surrounds a well bore, the method comprising the steps of:
   a. combining an aqueous fluid, a hydratable polymer, a crosslinking agent, and an enzyme breaker, comprising alkaline β-mannanase, derived from an alkaliphilic Bacillus sp. N16-5 gene, the gene being codon optimized for expression in E. coli, being a GST-mannanase fusion protein, having engineered restriction endunucleases sites flanking the 5' and 3' ends of the gene coding for the alkaline β-mannanase, comprising a gene sequence as depicted in FIG. 1A, or combinations thereof and the enzyme breaker being a member of the glycosyl hydrolase family 5, to produce a crosslinked polymer fluid;
   b. injecting the crosslinked polymer fluid into the well bore and into contact with the formation under sufficient pressure to fracture the surrounding subterranean formation; and
   c. allowing the enzyme breaker to degrade the crosslinked polymer gel so that it can be removed from the subterranean formation, the enzyme breaker being catalytically active and temperature stable in a temperature range of about 60° F. to about 225° F. and in a pH range of about 7 to about 12.

13. The method of claim 12, wherein the engineered restriction endonucleases comprise Xho1 and Bcl1.

14. The method of claim 12, wherein the hydratable polymer has repeating units of mannose linked by β-(1,4) mannosidic linkages.

15. The method of claim 12, wherein the hydratable polymer is selected from the group consisting of guar, guar derivatives, cellulose derivatives, water soluble biopolymers, or combinations thereof.

16. The method of claim 12, wherein the enzyme breaker has a maximum catalytic activity in a pH range of about 10.5 to about 11.5.

17. The method of claim 12, wherein the crosslinked polymer gel further comprises a second enzyme breaker that is catalytically active and temperature stable in a pH range of about 3 to about 11.

18. The method of claim 12, wherein the crosslinked polymer gel further comprises a divalent cation.

19. The method of claim 12, wherein the enzyme breaker has a total protein concentration of greater than about 1 mg/mL.

20. A fracturing fluid composition comprising:
   a. an aqueous fluid;
   b. a hydratable polymer;
   c. a crosslinking agent capable of crosslinking the hydratable polymer; and
   d. an enzyme breaker comprising alkaline β-mannanase derived from a gene having engineered restriction endoculease sites flanking the 5' and 3' ends of the gene coding for the alkaline β-mannanase, the enzyme breaker being catalytically active and temperature stable in a temperature range of about 60° F. to about 225° F. and in a pH range of about 7 to about 12.

21. The composition of claim 20, wherein the enzyme breaker is derived from an alkaliphilic Bacillus sp. N16-5 gene, being a GST-mannanase fusion protein, comprising a gene sequence as depicted in FIG. 1A, or combinations thereof and the enzyme breaker being a member of the glycosyl hydrolase family 5.

22. The composition of claim 20, wherein the hydratable polymer has repeating units of mannose linked by β-(1,4) mannosidic linkages.

* * * * *